55 HARROWS AND DIGGERS.
Hoes.
CLASSIFICATION
9705 +
DIVISION.
9705-X
Isaac W. Averill
6-11-1836
Garden Hoe.
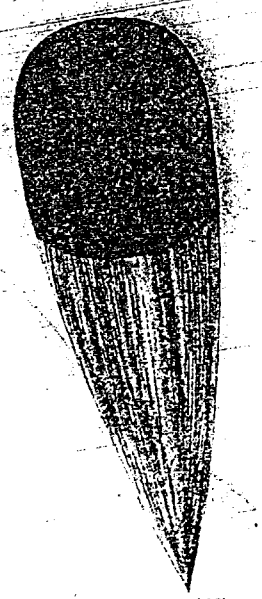
Front view.
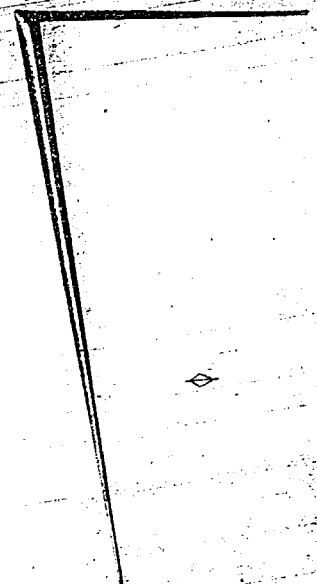
Side view.
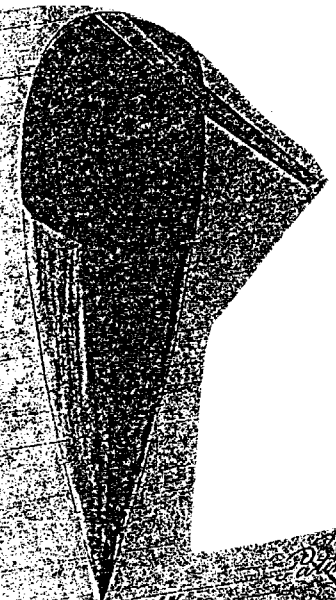
Back view.
Made under the direction of the Patents in confo[illegible] of the [illegible]

6/11/1836 9705X

June 11, 1836 384

Isaac W. Averill of Plymouth Michigan Ter.
Letters Patent

The Schedule referred to in these Letters Patent and making part of the same containing a description in the words of the said Isaac Averill himself of his improvement in the Garden Hoe.

To all to whom these Presents shall come: Be it known that I, Isaac W. Averill of the Town of Plymouth in the County of Wayne in the Territory of Michigan, have invented a new and useful improvement in the Garden Hoe, and the following is a full and exact description thereof.

The Shape and figure of said Hoe upon one side exactly corresponds with that of one side of the Indian flint or Buffaloe Spear, from which it was taken and the other side flat or concave being from four to six inches long in the blade, oval, lanceolate, thin edges, with a rib running through the centre lengthwise upon the back for support, thence a shank is turned little within the right angle with a hole in it to fasten into the handle, to be made of steel or iron, either wrought or cast as best suits the operator. What I claim as my improvement is its peculiar conformity to the Indian flint Witnesses
Thomas B. Clarke
Robert D. Powe Isaac W. Averill Exd [illegible]

(222 words)

(Drawing.)

(Granted June 11, 1836)